April 22, 1958 D. P. MANKA 2,831,754
SOLVENT EXTRACTION PROCESS
Filed May 10, 1954
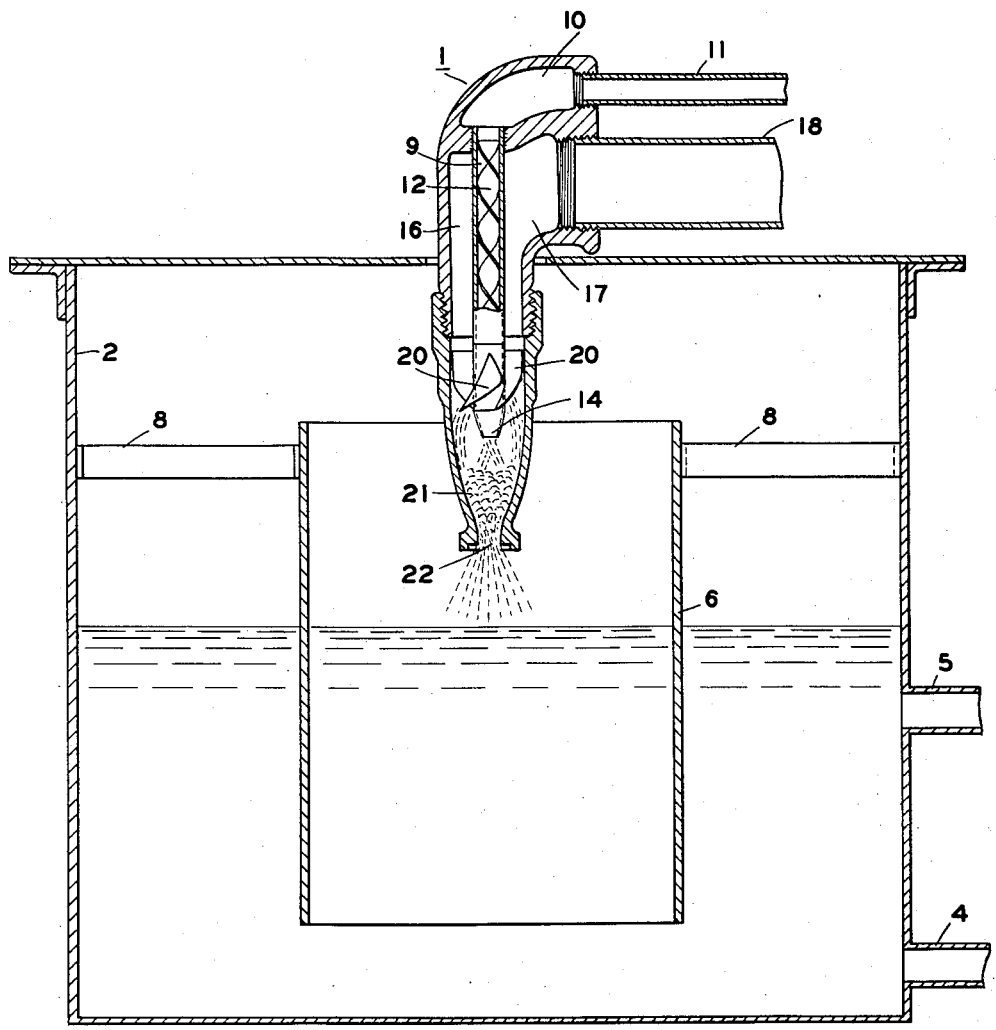
INVENTOR.
DAN P. MANKA
BY
*J. R. Harris*
ATTORNEY

United States Patent Office 2,831,754
Patented Apr. 22, 1958

2,831,754

SOLVENT EXTRACTION PROCESS

Dan P. Manka, Pittsburgh, Pa., assignor to Jones & Laughlin Steel Corporation, Pittsburgh, Pa., a corporation of Pennsylvania Application May 10, 1954, Serial No. 428,599

3 Claims. (Cl. 23—310)

This invention relates to a solvent extraction process and is more particularly concerned with a process for extracting or separating dissolved material from one liquid by means of a second liquid, the extraction being accomplished by mixing the two liquids in a jet.

Various forms of solvent extraction processes are employed to transfer dissolved material from one liquid to another liquid from which it may be more readily separated. It is a requisite of such processes that the two liquids be substantially insoluble one in another. It is another requisite that the two liquids be capable of separation one from another without undue difficulty. The two liquids are usually chosen so that their specific gravities differ by an amount permitting ready separation by gravity. Given these conditions, the problem of effecting economic solvent extraction is principally that of obtaining sufficiently intimate mixture of the two liquids so that the material to be removed or extracted from the first liquid is completely dissolved in the second liquid. The relative success with which this transfer is made is known as the efficiency of a stage of such solvent extraction process.

It is an object of my invention to provide a process by which two liquids may be so intimately mixed that an extraction efficiency of 100% is attained. It is another object of my invention to provide a process capable of rapidly achieving 100% extraction efficiency.

I have discovered that the above objects can be achieved if the two liquids are caused to mix in counter-rotating streams and are projected together as a jet, as will be described. A jet is known to be a stream of fluid projected as a rapidly moving unsupported column. A jet is usually formed by causing a fluid confined in an enclosed space to pass under pressure through a restricted opening or orifice. It is essential that there be a pressure differential across this orifice. In a present preferred embodiment of my invention, I form one liquid into a moving stream and cause it to rotate about its axis. I form the other liquid into a moving stream, which is coaxial with the first-mentioned stream but separated therefrom and is rotated about its axis in the counter direction. These two streams are then commingled and formed into a jet. The commingled liquids so projected are collected and separated one from the other by conventional means such as gravity separation. I find that an extraction of efficiency of 100% is achieved in the jet, and that no amount of further contact or intermixing of the two liquids will increase the extraction of the dissolved material.

Apparatus capable of carrying out the process of my invention is illustrated in the attached figure to which reference is now made.

In this figure, a vertical nozzle 1 is positioned above and directed down into a settling tank 2. This settling tank, which may be of any convenient size and configuration, is provided with a lower outlet 4 for the heavier liquid and an upper outlet 5 for the lighter liquid. It is also provided with a vertical shell 6 which is conveniently cylindrical in shape, open at both ends, and positioned to enclose the lower end of nozzle 1 and to project down into the settling tank 2, but to stop short of the bottom of this tank. This shell or baffle 6 may be spaced from tank 2 and supported by members 8—8.

Nozzle 1 is provided with an internal cylindrical passageway 9, the upper end of which opens into a feed chamber 10. This chamber 10 is connected by pipe 11 to a source of one liquid. Passageway 9 is provided with an internal twisted baffle or vane 12. At its lower end, passageway 9 is provided with an opening or orifice 14 of smaller diameter than the passageway itself so that fluid issuing therefrom will form a jet. Nozzle 1 is also provided with an annular passageway 16 which surrounds inner passageway 9 and is coaxial therewith. Passageway 16 communicates at its upper end with a feed chamber 17, which in turn is connected by a pipe 18 to a source of the second liquid. Passageway 16 is provided near its lower end with a plurality of twisted vanes 20—20. The lower end of nozzle 1 is provided with a casing 21 which tapers toward an orifice 22 which is of smaller diameter than the upper end of casing 21 so that fluid may issue therefrom as a jet.

The two liquids under pressure are supplied to nozzle 1 through pipes 11 and 18 respectively. The liquid introduced into passageway 9 is caused to rotate about its axis by twisted vane 12 as it passes therethrough. The liquid introduced into passageway 16 is caused to rotate about its axis by vanes 20 as it passes therethrough. Vane 12 and vanes 20 are twisted in opposite senses so that the two streams of liquid rotate in opposite directions. As has been mentioned, the orifice 14 of passageway 9 is restricted in exit area so that the liquid from passageway 9 issues therefrom as a jet which commingles with the rotating annular stream of liquid issuing from passageway 16. These two counter-rotating streams become intimately mixed in chamber 21 and are projected therefrom as a jet through orifice 22 into settling tank 2. The jet leaving orifice 22 assumes the form of a spray cone of liquid particles travelling with considerable velocity. In the formation of this jet the two liquids are so intimately intermixed that equilibrium is achieved between the solvent and the extracted material and also between the solute and the unextracted material. No substantial mixing takes place in settling tank 2, which is merely a receptacle to contain the liquids while the heavier settles below the lighter. The heavier liquid is drawn off through pipe 4, and the lighter liquid is drawn off through pipe 5. Baffle 6 is provided to shield discharge pipes 4 and 5 from turbulence caused by the jet from orifice 22 entering the liquid in the tank.

My process is particularly adapted for continuous solvent extraction, since the extraction is completed in the jet and the separated liquids can be drawn off from the settling tank as rapidly as separation is effected. When my process is carried out in the apparatus above described, I find that it makes no difference in extraction efficiency which liquid is passed through the inner passageway and which through the outer passageway. I find that a pressure difference of about five pounds per square inch is sufficient to provide the necessary jet, that is to say the pressure within casing 21 must be about about five pounds or more per square inch higher than atmospheric.

I claim:

1. The process of extracting material dissolved in a first liquid by means of a second liquid which is a solvent for said material, the liquids being substantially insoluble in each other, comprising counter-rotatingly commingling said liquids under pressure into a jet, whereby said liquids are intimately mixed and equilibrium is attained between said first liquid and unextracted material and between said second liquid and extracted material, collecting said commingled liquids and separating one from the other.

2. The process of extracting material dissolved in a first liquid by means of a second liquid which is a solvent for said material, the liquids being substantially insoluble in each other, comprising forming said first liquid into a first stream rotating about its axis, forming said second liquid into a second stream rotating about its axis in a direction opposite to that of said first stream, commingling said streams under pressure into a jet, whereby said liquids are intimately mixed and equilibrium is attained between said first liquid and unextracted material and said second liquid and extracted material, collecting said commingled liquids and separating one from the other.

3. The process of extracting material dissolved in a first liquid by means of a second liquid which is a solvent for said material, the liquids being substantially insoluble in each other, comprising forming one of said liquids into a jet rotating about its axis, forming the other said liquid into a hollow stream coaxial with said jet and rotating in the opposite direction about its axis, introducing said jet of one liquid into said stream of the other liquid, forming a jet of said commingled liquids, whereby the liquids are intimately mixed and equilibrium is attained between said first liquid and unextracted material and between said second liquid and extracted material, collecting said commingled liquids and separating one from the other.

References Cited in the file of this patent

UNITED STATES PATENTS

| | | |
|---|---|---|
| 1,315,765 | Eckart | Sept. 9, 1919 |
| 2,534,253 | Fash | Dec. 19, 1950 |
| 2,645,463 | Stearns | July 14, 1953 |
| 2,682,452 | Wainwright | June 29, 1954 |

FOREIGN PATENTS

| | | |
|---|---|---|
| 105,776 | Australia | Nov. 9, 1938 |